US005163292A

United States Patent [19]

[11] Patent Number: 5,163,292

Holleyman

[45] Date of Patent: Nov. 17, 1992

[54] SIMPLIFIED FLUID PRESSURE OPERATED ENGINE

[76] Inventor: John E. Holleyman, 3402 Polk St., Monroe, La. 71202

[21] Appl. No.: 687,636

[22] Filed: Apr. 19, 1991

[51] Int. Cl.[5] .................... F16D 31/02

[52] U.S. Cl. .................... 60/370; 60/371; 60/407; 417/65

[58] Field of Search .................... 60/370, 371, 375, 407, 60/409, 412, 413, 416; 91/508, 442, 468, 469, 449; 417/77, 79, 65, 87; 137/625.11, 624.13

[56] References Cited

U.S. PATENT DOCUMENTS

| | | | |
|---|---|---|---|
| 3,212,409 | 10/1965 | Mash | 137/625.11 |
| 3,613,357 | 10/1971 | Withington | 91/442 |
| 3,925,984 | 12/1975 | Holleyman | 60/370 |
| 4,070,947 | 1/1978 | Crewse | 91/468 |
| 4,124,978 | 11/1978 | Wagner | 60/412 |
| 4,162,614 | 7/1979 | Holleyman | 60/370 |
| 4,253,692 | 3/1981 | Garlinghouse | 91/442 |
| 4,554,942 | 11/1985 | Williams et al. | 137/625.11 X |
| 4,896,505 | 1/1990 | Holleyman | 60/370 |

FOREIGN PATENT DOCUMENTS

| | | | |
|---|---|---|---|
| 301596 | 7/1971 | U.S.S.R. | 137/625.11 |

*Primary Examiner*—Edward K. Look
*Assistant Examiner*—Hoang Nguyen
*Attorney, Agent, or Firm*—Laurence R. Brown

[57] ABSTRACT

Controls for operating fluid pressure fueled reciprocating piston engines are simplified by passing fuel directly to a cylinder inlet port from a synchronously timed rotary distributor. This permits a snap acting diaphragm transfer valve normally opening the inlet fuel path to the cylinder to respond to a decrease in fuel pressure to quickly snap open an exhaust port and close the inlet port. Several embodiments include a battery operated fuel supply source, recycling of spent fuel, and auxiliary exhaust paths from bottom dead center cylinder positions, to increase efficiency, speed and reliability.

5 Claims, 3 Drawing Sheets

SIMPLIFIED FLUID PRESSURE OPERATED ENGINE

TECHNICAL FIELD

This invention relates to reciprocating piston engines powered by fluid fuel under pressure, and more particularly it relates to the processing of fuel and exhaust in such engines.

BACKGROUND ART

I have proposed and patented a series of fluid operated engines, the most recent being U.S. Pat. No. 4,896,505, Jan. 30, 1990, which represents the state of the prior art. In that patent complex and relatively slowly acting shuttle valves were required as input-exhaust valves as programmed from the fluid pressure fuel source through a rotary distributing valve. This system introduced some time delays and inefficiencies in operation of such fluid pressure operated engines which will be made more apparent hereinafter.

Such engines fueled by pressurized fluids are particularly useful where supplies of compressed natural gas, compressed air or other fluids under pressure are available, and when operations at high ambient temperatures provide significant cooling problems with internal combustion engines.

It is therefore an object of the present invention to provide improved fluid pressure operated engines.

A more specific object of the invention is to simplify construction and the number of moving parts used in such engines.

Another object of the invention is to provide improved operating efficiency of such engines.

A still further object of the invention is to precisely control the timing of engine valves with simple and reliable mechanisms which contribute to lower engine cost.

Yet another object of the invention is to introduce novel operating methods for fluid pressure operated reciprocating piston engines.

DISCLOSURE OF THE INVENTION

A reciprocating piston fluid pressure fueled engine has fuel synchronously injected into each cylinder for a power stroke by a rotary distributor valve. In a preferred embodiment the spent fuel is exhausted during the return exhaust reciprocation stroke by means of a pressure sensitive snap action transfer valve normally positioned to open a fuel inlet passageway into the cylinder and responsive to a cylinder pressure exceeding the fuel pressure to move into a position opening an exhaust port from the cylinder. Thus, a simplified engine operates with a synchronous fuel distributor and self operating exhaust valve in an efficient operating mode which accommodates recycling of spent fuel to recover its remaining pressure energy. In one embodiment, the engine may be operated from batteries.

Further objects, features and advantages of the invention will be found throughout the following description, claims and accompanying drawings.

BRIEF DESCRIPTION OF THE DRAWINGS

In the drawings, wherein like reference characters signify similar features in the several views to facilitate comparison.

THE PREFERRED EMBODIMENTS

It has been found that a critical feature in the operation efficiency and performance characteristics of reciprocating piston engines fueled by fluid under pressure is precise synchronous timing of fuel input and exhaust valves under various engine loads and operating fuel pressure conditions. Thus, when fuel input and exhaust valves are operated from pilot fluid pressure signals subject to various pressures and passageway friction conditions such critical timing is not available over a wide range of operating conditions. For example, if fuel pressures or temperatures change, the timing may vary and thus require sophisticated timing devices. In particular spring loaded valves overcome by pilot fluid pressure are subject to changed operating conditions with temperature changes and fuel pressure variations, so that optimum operating efficiencies cannot be sustained over a wide range of conditions. Also mechanical conditions such as friction and wear affect timing and efficiency. Nor is it desirable to provide complex correctional devices such as computers to change timing with conditions that may be encountered.

Furthermore, it is most desirable to provide low equipment costs, simplicity of construction and maintenance and long life. In particular, the wear of moving mechanical parts in frictional contact should be minimized to both decrease the effect of construction tolerance variations, to avoid friction losses and to reduce the frequency of repair and maintenance. From a reliability standpoint, fewer parts, fewer movable mechanisms and less complex operating conditions all contribute to higher reliability.

Figure 1:
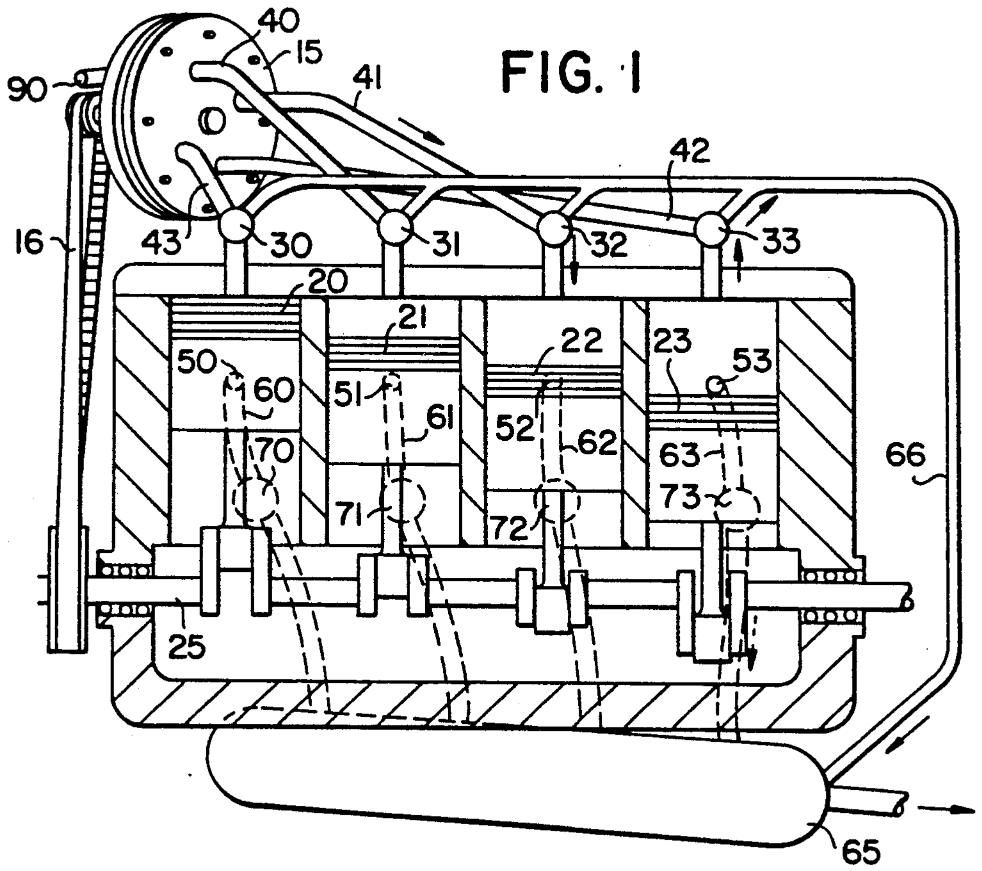
FIG. 1 is a sketch, partly in section of a reciprocating piston fluid pressure fueled engine embodying the invention.

Accordingly this invention provides an improved mode of operation that increases life, reliability and operating efficiency with simple, lower cost construction, as may be seen from the FIG. 1 embodiment. A critical element of this invention is the synchronous rotary fuel distributor 15, which is rotated in precise timing with the reciprocation cycle of pistons 20–23, by timing belt 16 geared to drive shaft 25.

Figure 2:
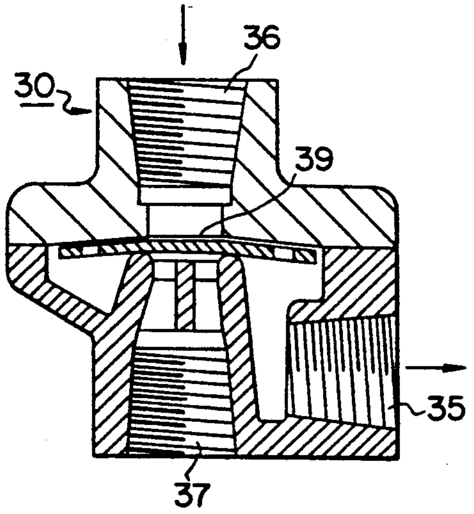
FIGS. 2 and 3 are respective section view sketches of a self acting diaphragm operated transfer valve showing fuel inlet and cylinder exhaust valve positions.
Figure 3:
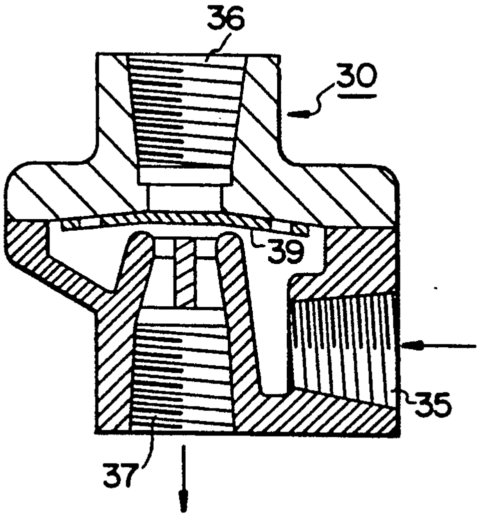

Another critical element of this invention is the nature and operation of the input-exhaust valves 30–33, as may be better understood by reference to FIGS. 2 and 3. These valves constitute self acting, diaphragm operated, snap-action, transfer valves which connect the cylinder at port 35 respectively to either the fuel inlet port 36 or the exhaust port 37. Such valves are commercially available in various sizes under the trade name "PNEU-TROL". Preferably the exhaust port 37 is larger than the inlet port 36 to more effectively facilitate a faster exhaust of the cylinders at a reciprocation cycle timing just past bottom dead center when the power stroke is over and the operating efficiency of the engine critically depends upon the efficiency of the exhaust function.

These diaphragm valves 30 are self actuating depending upon the differences in pressure at the inlet and exhaust ports. When the exhaust pressure exceeds the inlet pressure the diaphragm 39 instantaneously snaps from a normally closed exhaust port position (FIG. 2) to a closed inlet port position (FIG. 3). Another advantage of such valves is that they can be operated in any position. For avoiding transit delays and losses, the valves 30 are preferably mounted directly at the cylinder head, but can be anywhere in the conduit passageways 40–43 from the fuel distributor 15 leading to the various cylinders (FIG. 1). The engine embodiment shown has four cylinders conventionally aligned along crankshaft 25 as an in-line engine, but it should be evident to those skilled in the art that the invention is equally applicable to one or more cylinders arranged in various configurations including a concentric arrangement of cylinders and pistons about the drive shaft in a radial engine embodiment.

The engine is operable in an efficient manner without further control valves for inlet and exhaust purposes, but under some operating pressures or environmental conditions or in some engine configurations having critical space limitations, a more rapid exhaust of spent fuel from the cylinders will improve efficiency and/or motor operating speeds. Thus exhaust ports 50–53, simply holes drilled in cylinder walls at the bottom dead center position of the respective pistons 20–23, will also permit rapid exhaust of spent fuel to escape quickly at critical self actuated timing without additional moving parts.

The spent fuel is discharged through conveyance conduit piping such as shown at 60–63 for exhaust ports 50–53 and is recovered in tank 65 for recycling to recover its still present latent energy. Each such pipe 60–63 has a one way flow valve 70–73 permitting passage of spent fuel exceeding a predetermined pressure toward tank 65. Similarly, exhaust line 66 is provided leading from exhaust ports 37 of diaphragm valves 30–33.

Figure 4:
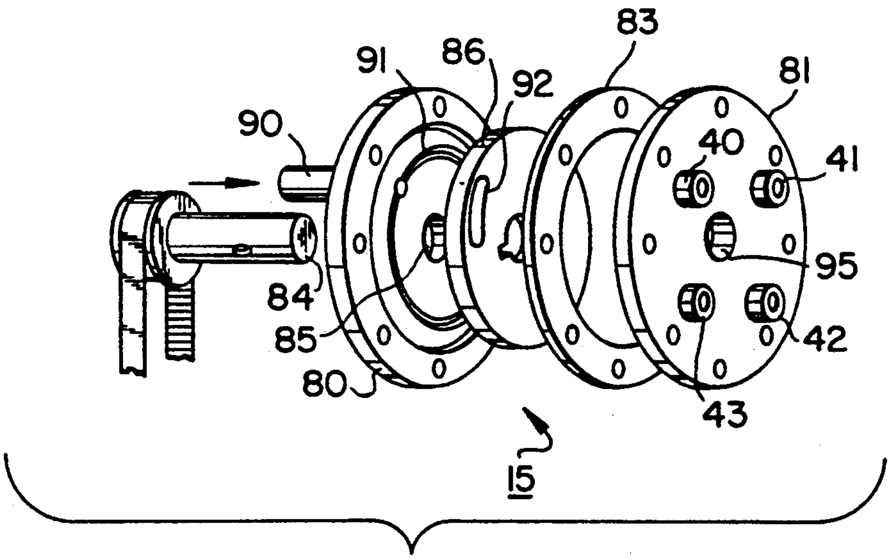
FIG. 4 is an exploded view of a fuel distribution valve afforded by this invention.
Figure 5:
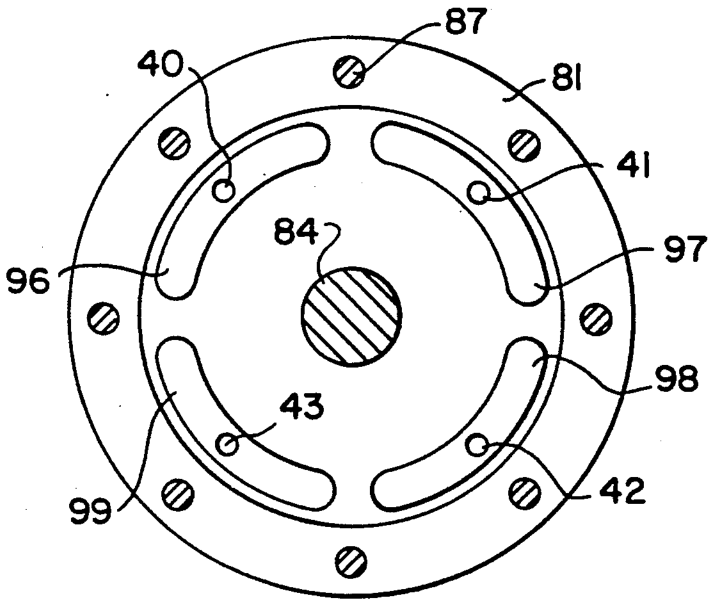
FIG. 5 is a plan view, partially in section of a rotary fuel distributor element of the distribution valve.

The construction and operation of the fuel distributor 15 is illustrated in more detail in FIGS. 4 and 5. Stator parts are housing plates 80, 81 and gasket 83 held together by bolts 87. Rotor parts carried on shaft 84, journalled in bearings 85, 95, are keyed to rotating distributor plate 86. Thus, the fuel inlet port conveys fuel in groove 91 for distribution by rotation of distributing valve plate 86 port 92 in timed relationship with the reciprocation cycles of the engine pistons to the respective outlet ports 40–43. The shaped recesses 96–99 in cover plate 81 as scanned by distributing valve plate 86 port 92 thus time the input flow of pressurized fuel into the respective cylinders over the power stroke of the reciprocation cycle. Thus, the flow of fuel begins just after top dead center position of the pistons and terminates before bottom dead center position. Accordingly, termination of delivery of the fuel under pressure in each cylinder automatically actuates the respective diaphragms 39 of valves 30–33 to snap from the normal fuel delivery position with the exhaust ports 37 closed into the exhaust position with the fuel inlet ports 36 closed because of the then greater pressure in the cylinder from the spent fuel than at the closed inlet port 36. This provides substantially instantaneous exhaust without any delays introduced by reaction to flow of fuel or inertia and friction of moving parts which may be accentuated in the presence of spring biased parts. This advantageously very simply times the engine, with little variation of critical timing possible from expected changes of fuel pressure, wear or environmental conditions.

Figure 6:
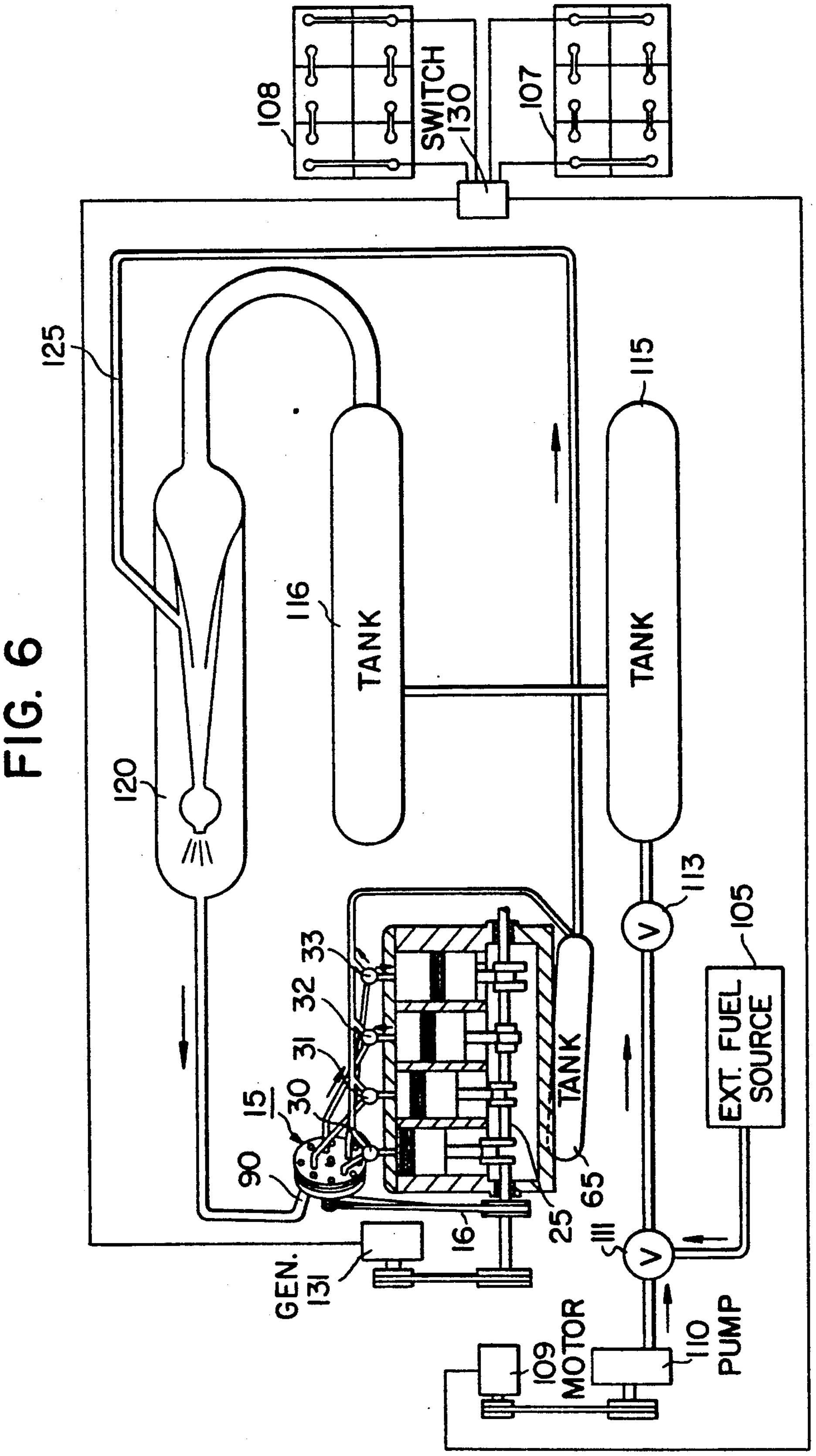
FIG. 6 is a diagrammatic view, partly in section, of a battery operated engine embodiment of the invention.

The more comprehensive engine embodiment of FIG. 6 shows the same basic engine structure as in FIG. 1 coupled with peripheral operating structure now discussed. In particular the fuel feed system is shown in more particularity. In general these engines have particular utility at sites where fluid pressure external fuel sources 105 are available, such as at well sites for natural gas, for example. The source otherwise could include bottled gas under pressure. In this embodiment, the batteries 107, 108 provide auxiliary fuel by way of motor 109 and compressor-pump 110. Thus the transfer valve 111 provides for choice of internal battery supplied fuel or a suitable source of external fuel at the input fuel line 112. The one way flow check valve 113 assures that fuel from line 112 only flows into storage-pressure stabilization tanks 115, 116. These tanks supply the primary source of fuel to the venturi mixer 120 and the fuel distributor 15 hereinbefore described.

A secondary fuel source is tank 65 which accumulates spent fuel from the engine in the manner hereinbefore described. That lower pressure fuel is mixed with the primary fuel by way of input line 125 to mixer 120 in the manner set forth in my aforementioned patent.

In order to keep the batteries 107 and 108 in a charged condition and ready for emergency or interim use, a changeover switch 130 connects a discharged battery to a charging source such as generator 131, or an external source of power when an electric power option is desired. Then one of the batteries 107, 108 that is charged will operate the motor 109 to drive pump 110 for providing compressed air under pressure as fuel, for example.

It can now be recognized that the operational efficiency of this engine is high because of its unique construction and operating mode. For example, very little energy is required for cylinder compression on the exhaust stroke of the pistons due in part to the very fast exhaust features herein made available. Nor is there any substantial friction or work imposed by the exhaust valves 30–33 over their cycle of operation as provided by this invention. The distributor 15 does not significantly load the engine, so that substantially the only frictional losses that are significant are those encountered in the piston-cylinder-drive shaft assembly, which makes this engine highly efficient. Also the efficiency in using the fuel is improved significantly by the critical and closely maintained timing of the exhaust and power cycles thereby approaching the maximum available power output feasible from the available fuel, and permitting higher engine speeds than heretofore feasible.

Having thus advanced the state of the art, those features of novelty describing the spirit and nature of this invention are set forth with particularity in the following claims.

I claim:

1. A power plant operable with fluids under pressure comprising in combination, a plurality of cylinders, piston means for movement in said cylinders, means for cyclically reciprocating said piston means through reciprocation cycles for operating a rotary power plant takeoff shaft in an operation mode with fluid pressure applied to the piston means only in one direction of the reciprocation cycle, a source of fluid under pressure for use as fuel in said power plant, rotary distributor timing means, synchronizing means for synchronizing rotation of said rotary distributor with reciprocations of said piston means for cyclically gating fluid fuel from said source into said cylinders in a power stroke over a time period starting at top dead center of a reciprocation cycle of each said piston and ending substantially at bottom dead center of the reciprocation cycle for powering each cylinder to reciprocate each corresponding piston, a conduit path directed respectively from the rotary distributor timing means to each respective said cylinder to deliver fluid fuel, and asynchronously operating power plant intake-exhaust cylinder valving means for each cylinder comprising a pressure sensitive snap action diaphragm transfer valve coupled to noramlly close a transfer valve exhaust port coupled in the conduit path between the timing means and each respective cylinder to respectively pass fluid fuel into the cylinder during said power stroke and to snap into a condition exhausting the cylinder and closing the inlet fuel port in response to a change of fluid pressure differential between said distributor means and said cylinder.

2. The engine defined in claim 1 including a motor operated compressor pump providing said fluid under pressure.

3. The engine defined in claim 1 further comprising fluid mixing means coupled between said source of fluid and said distributor means coupled to mix the spent fuel at lower pressure with the fluid from said source thereby to recover energy from spent fuel.

4. The engine defined in claim 1 further comprising auxiliary exhaust ports in each said cylinder uncovered by position of the position near bottom dead center of a reciprocating cycle.

5. The engine defined in claim 4 further comprising a spent fuel conduit coupled from each said exhaust port to an accumulation tank, with each conduit containing a one way exhaust valve.

* * * * *